(12) United States Patent
Tomita

(10) Patent No.: US 7,168,742 B2
(45) Date of Patent: Jan. 30, 2007

(54) SEATBELT DEVICE

(75) Inventor: Hiroshi Tomita, Omihachiman (JP)

(73) Assignee: Takata Corporation, Tokyo (JP)

( * ) Notice: Subject to any disclaimer, the term of this patent is extended or adjusted under 35 U.S.C. 154(b) by 202 days.

(21) Appl. No.: 10/632,848

(22) Filed: Aug. 4, 2003

(65) Prior Publication Data
US 2004/0041390 A1    Mar. 4, 2004

(30) Foreign Application Priority Data
Aug. 29, 2002    (JP)    ............... 2002-250634

(51) Int. Cl.
   *B60R 22/36*    (2006.01)
(52) U.S. Cl. .................. 280/806; 24/633; 297/480
(58) Field of Classification Search ................ 280/806, 280/805; 297/480; 24/629, 633, 640, 642
See application file for complete search history.

(56) References Cited

U.S. PATENT DOCUMENTS

| | | | | |
|---|---|---|---|---|
| 4,008,909 A | * | 2/1977 | Otani et al. ................ 297/470 |
| 5,374,110 A | * | 12/1994 | Hiramatsu ................ 297/480 |
| 5,487,563 A | * | 1/1996 | Hiramatsu ................ 280/806 |
| 5,492,368 A | * | 2/1996 | Pywell et al. ............. 280/806 |
| 5,596,795 A | * | 1/1997 | Beisswenger ............. 24/633 |
| 5,742,987 A | * | 4/1998 | Mikulec et al. ........... 24/633 |
| 5,784,766 A | * | 7/1998 | Downie et al. ............ 24/641 |
| 5,845,939 A | * | 12/1998 | Greiner et al. ............ 280/806 |
| 6,076,239 A | | 6/2000 | Kopetzky et al. |
| 6,179,330 B1 | * | 1/2001 | Wier ...................... 280/806 |
| 6,213,513 B1 | * | 4/2001 | Grabowski et al. ....... 280/806 |
| 6,409,217 B1 | * | 6/2002 | Denis ...................... 280/806 |
| 6,463,639 B1 | * | 10/2002 | Mori ....................... 24/629 |

FOREIGN PATENT DOCUMENTS

GB          2328244 A    *    2/1999

\* cited by examiner

*Primary Examiner*—Ruth Ilan
(74) *Attorney, Agent, or Firm*—Foley & Lardner LLP

(57) ABSTRACT

A seat belt device includes a lap anchor and connector assembly that are engaged by a latch pressed by a first latch spring. In the event that inertia force is applied to the connector assembly in a direction that tends to urge the disengagement of the connector assembly and the lap anchor, the latch tries to move in the direction of disengagement. The attempted movement causes retaining shoulder portions of the latch to abut against latch holding portions of a second latch spring, thereby preventing movement of the latch in the direction of disengagement. Thus, engagement of the connector assembly and the lap anchor is stable, and disengagement of the connector assembly and the lap anchor is prevented.

15 Claims, 5 Drawing Sheets

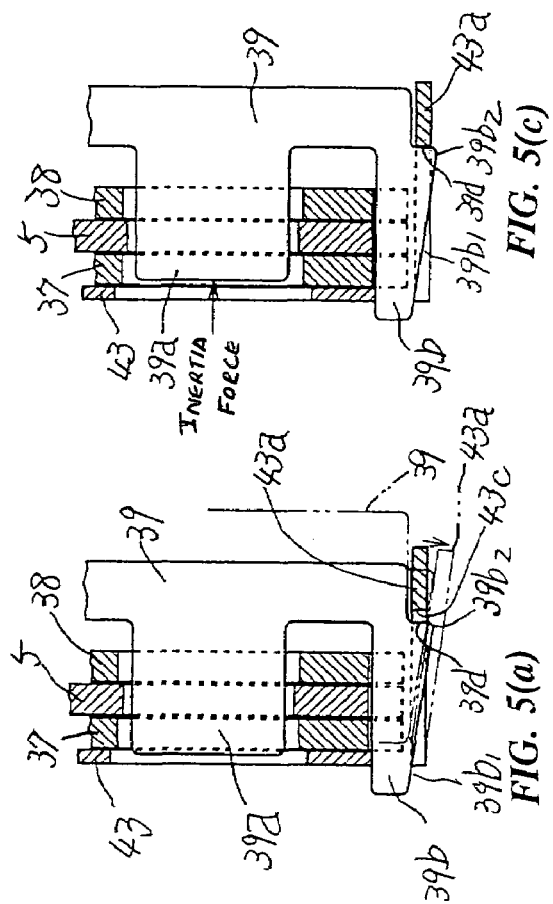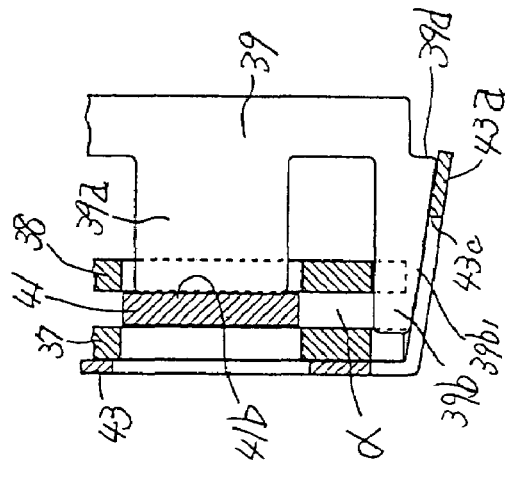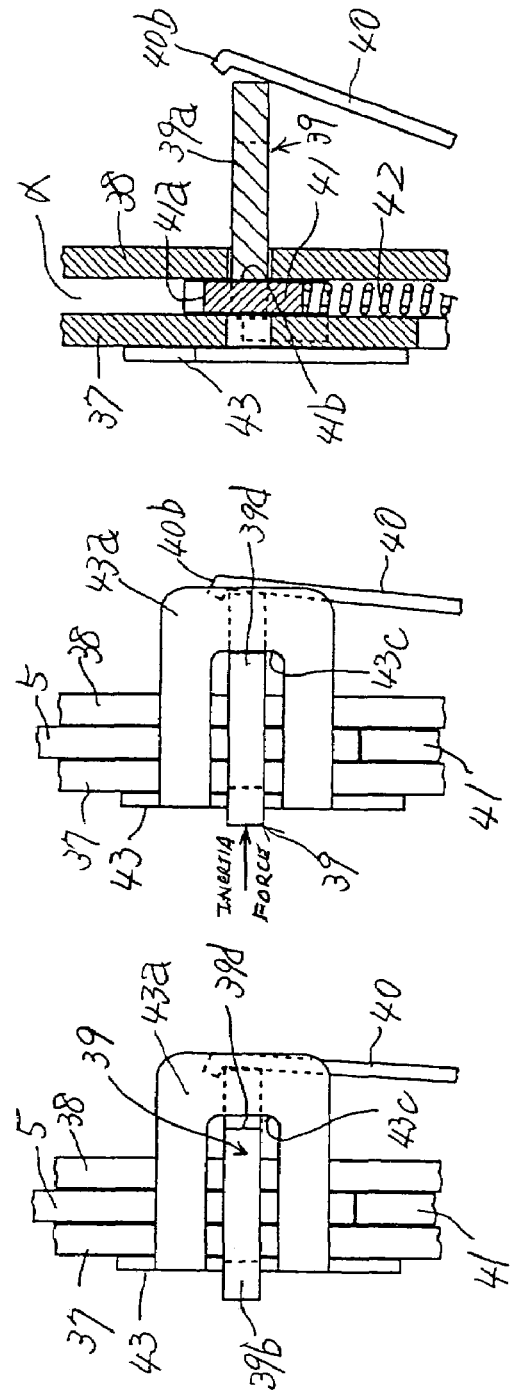

SEATBELT DEVICE

BACKGROUND

The present invention relates to seatbelt devices installed in vehicles such as automobiles, for restraining and protecting passengers in the event of an emergency such as vehicle collisions. In particular, the present invention relates to a seatbelt device wherein a pretensioner is provided to at least one of a lap anchor portion and a buckle portion.

Seatbelt devices may include a seatbelt retractor fixed to the body of the vehicle near the seat. The retractor spools the seatbelt in normal conditions in a manner whereby the seatbelt can be withdrawn. The retractor is also configured to prevent withdrawing of the seatbelt to allow the seatbelt to restrain and protect passengers in the event of an emergency such as a vehicle collision. The devices typically include a seatbelt which extends from the seatbelt retractor with the tip portion thereof being linked to a lap anchor portion fixed to the vehicle body at a portion on the outer side of the vehicle seat for example, so as to restrain the passenger belting the seatbelt. The devices also may include a buckle fixed to the vehicle body at a portion on the inner side of the vehicle seat for example, and a tongue slidably provided on the seatbelt so as to be detachably engaged with the buckle. Typically, the tongue engages with the buckle so that the seatbelt passes over the shoulder, chest, and waist of the passenger.

Normally, the seatbelt is relatively loosely wound by the seatbelt retractor and fit to the passenger to a degree wherein the seatbelt is woundable and withdrawable and does not give a feeling of pressure to the passenger, and in the event that great vehicle deceleration occurs in the event of an emergency such as the vehicle colliding, withdrawing of the seatbelt is prevented even though the passenger tries to move forward due to inertia, thereby restraining and protecting the passenger.

Certain conventional seatbelt devices may include a pretensioner for speedily restraining the passenger with a great restraining force by improving the restraining properties by removing the slack in the seatbelt and speedily tensioning the seatbelt in the event of an emergency such as the vehicle colliding. An example of such a seatbelt device is disclosed in Japanese Unexamined Patent Application Publication No. 6-344866 (incorporated by reference herein), wherein a pretensioner is provided to a lap anchor portion where the tip of the seatbelt is linked. With the seatbelt device disclosed in this Unexamined Patent Application Publication, the action of the pretensioner in an emergency such as mentioned above pulls the seatbelt linked to the lap anchor, thereby removing the slack from the seatbelt and speedily tensioning the seatbelt.

The pretensioner is fixed to the vehicle body for seatbelt devices having the pretensioner at the lap anchor portion. However, in order to facilitate assembly of the pretensioner to the vehicle body, the lap anchor portion and the connector portion of the pretensioner are separated. The lap anchor portion is normally inserted into and engaged with (latched to) the connector portion, thereby linking the seatbelt and the pretensioner.

However, in the event of pulling the seatbelt due to action of the pretensioner in the event of an emergency such as mentioned above, the inertial forces acting on the connector portion of the pretensioner in the direction of disengaging the latch mechanism latching the lap anchor and the pretensioner could conceivably lead to instability in the engagement between the lap anchor and the connector.

One of the many objects of the present invention is to provide a seatbelt device having stable engagement of the connector of the pretensioner and the seatbelt-side anchor even in the event that the aforementioned inertia force acts thereupon.

SUMMARY OF THE INVENTION

According to an embodiment of the present invention a seatbelt device is provided. The device includes a pretensioner having at least one of a lap anchor portion and a buckle portion. The pretensioner includes a connector portion, and the at least one of lap anchor portion and buckle portion includes an anchor for being inserted into and engaged with the connector portion. The connector portion includes a latch mechanism for engaging the anchor with the connector portion, and a disengagement prevention mechanism for preventing disengagement between the connector portion and the anchor in the event that inertia force acts upon the connector portion in the direction of disengaging the engagement of the connector portion and the anchor by the latch mechanism.

According to another embodiment of the present invention, the latch mechanism may include a latch for engaging the anchor with the connector portion, and an elastic pressing member for pressing the latch in the direction of engagement between the anchor and the connector portion. The disengagement prevention mechanism may include an elastic prevention member for engaging with the latch and preventing the latch from moving in the direction of disengagement of the anchor and the connector portion.

The pressing in the engaging direction of the latch is performed elastically by the elastic pressing member, and movement in the direction of disengaging the engagement of the latch is performed elastically by the elastic prevention member, so in the event that there is the need to disengage the engagement of the connector portion and the anchor, the engagement of the connector portion and the anchor can be readily disengaged by applying an external force greater than the aforementioned inertia force in the direction of disengaging the engagement by the latch.

Further, according to another embodiment of the present invention, the elastic pressing member and the elastic prevention member are both formed of leaf springs.

The elastic pressing member and the elastic prevention member are both formed of leaf springs, so the structure of the connector portion of the pretensioner is simplified, and the connector portion can be formed inexpensively The seat belt device according to at least one of the embodiments of the present invention, even in the event that inertia force acts on the connection portion of the pretensioner in the direction for disengaging the engagement of the connector portion and anchor by the latch mechanism, disengagement of the connector portion and the anchor is prevented in a sure manner by the disengagement prevention mechanism.

Thus, engagement of the connector portion and the anchor is stable, so the passenger is restrained and protected by the seatbelt in an even more sure manner even in the event that such inertia force acts upon the connector portion.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 4 illustrates the connector assembly shown in FIG. 3, wherein

FIG. 5 describes prevention of inertial disengaging of the latch by the second latch spring, wherein FIG. 5(a) is a diagram describing the state of the latch in an engaged position by way of a partial cross-section, FIG. 5(b) is a diagram viewing FIG. 5(a) from below, FIG. 5(c) is a diagram describing inertial disengaging of the latch, FIG. 5(d) is a diagram viewing FIG. 5(c) from below, FIG. 5(e) is a diagram describing the state of the latch in a disengaged position by way of a partial cross-section, and FIG. 5(f) is a diagram viewing FIG. 5(e) from below.

DETAILED DESCRIPTION

Embodiments of the present invention will be described below, with reference to the drawings.

Figure 1:
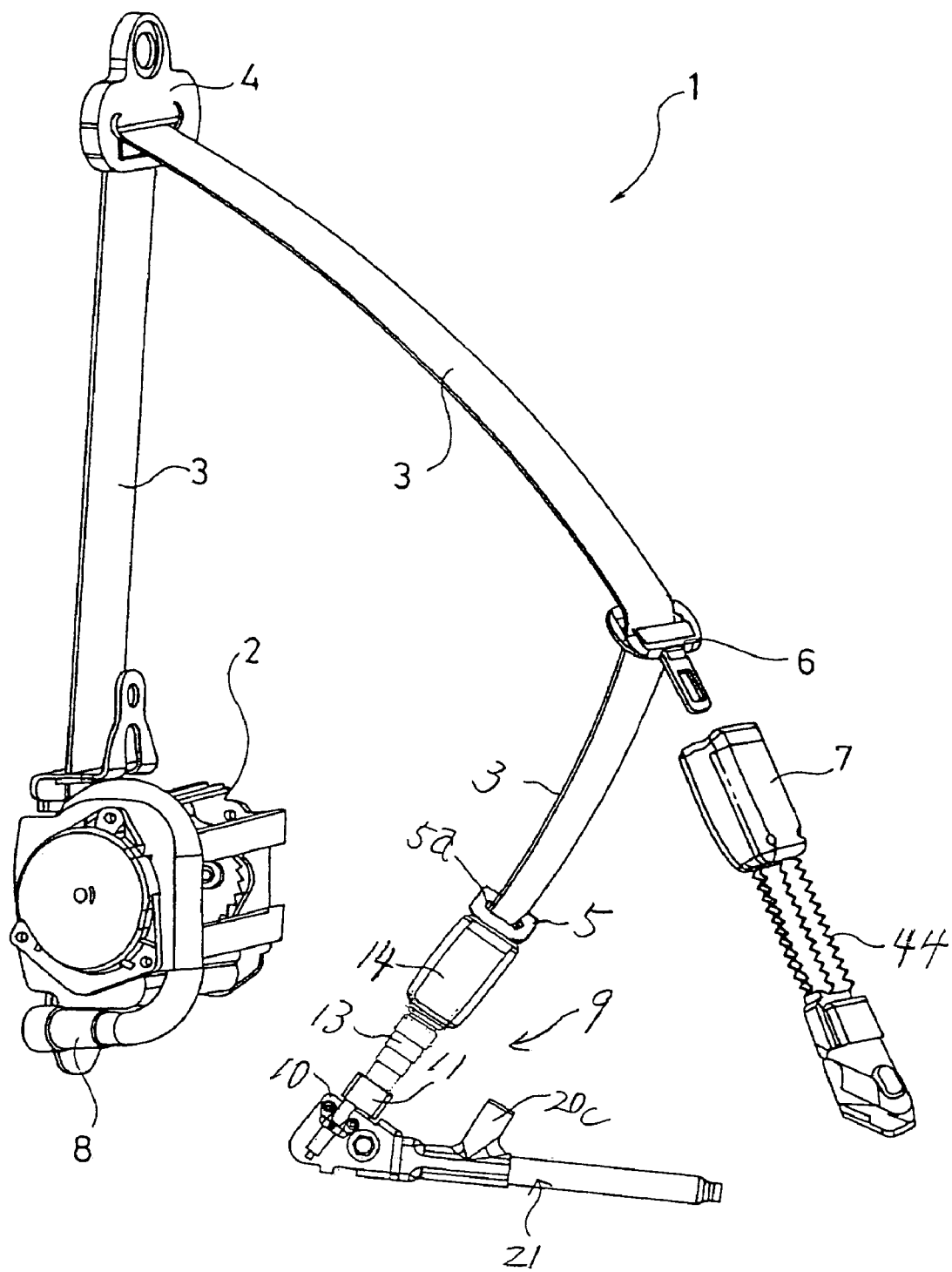
FIG. 1 is a diagram which schematically illustrates an example of an embodiment of the seatbelt device according to the present invention.

As shown in FIG. 1, according to an embodiment of the present invention, a seatbelt device 1 includes a seatbelt retractor 2 which is fixed to the vehicle body floor or the like, and a shoulder anchor 4 which is attached to a center pillar or the like of the vehicle and acts to guide a seatbelt 3 from the seatbelt retractor 2 to a predetermined position as to the passenger. The device 1 also includes a lap anchor portion which is fixed to the vehicle floor or the like on the vehicle body at the outer side of the vehicle seat, for example. The lap anchor portion has a lap anchor 5 with a through hole 5a through which the tip of the seatbelt 3 is passed so as to be linked, a known tongue 6 which is slidably supported on the seatbelt 3, and a buckle portion having a known buckle 7 to which the tongue 6 can be engaged, which is fixed to the vehicle floor or the like on the vehicle body at the inner side of the vehicle seat.

The seatbelt retractor 2 may be an emergency locking seatbelt retractor having a pretensioner 8 (ELR with pretensioner). The scope of the present invention is not limited to the seatbelt retractor 2 described above, as any one of many known seatbelt retractors may be used, such as, for example, an ELR without a pretensioner 8, an automatic locking seatbelt retractor (ALR), and seatbelt retractor having a load limiter for restricting the load acting upon the seatbelt, and so forth.

Also, the lap anchor portion is the portion where the tip of the seatbelt 3 is fixed to the vehicle body, and a lap-outer pretensioner 9 (hereafter referred to simply as pretensioner) is provided to the lap anchor portion. The lap anchor 5 is fixed to the vehicle body via the pretensioner 9. The pretensioner 9 used in the seatbelt device 1 in this example generates a high-pressure reaction gas by reaction of reactive substances in the event of an emergency such as the collision of the vehicle, and pulls the seatbelt 3 in the direction of the lap anchor 5 using the force generated by this reaction gas.

Figure 2:
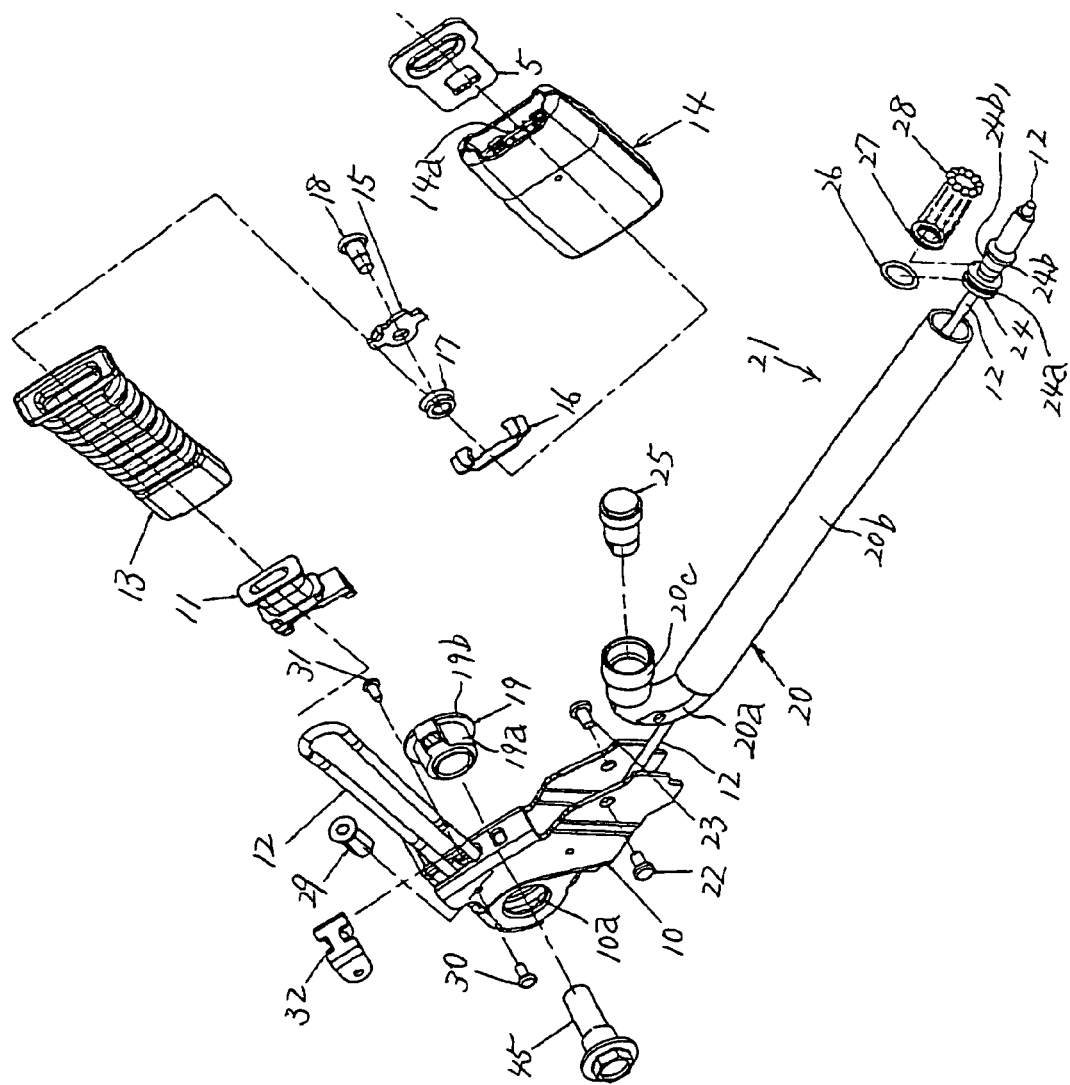
FIG. 2 is a disassembled perspective view of a pretensioner used in the example of the seatbelt device shown in FIG. 1.

As shown in FIG. 2, the pretensioner 9 in the illustrated example has a wire holder 11 attached to a bracket 10. The wire holder 11 is for holding and guiding a wire 12. Also, the wire holder 11 has one end of an axially expandable and collapsible rectangular tube-shaped inner cover 13 connected thereto, and the other end of the inner cover 13 is attached to a connector assembly 14 (equivalent to the connector portion of the present invention) to which the lap anchor 5 is inserted and thereby retained. Within the connector assembly 14, a wire plate 15 is attached to the opposite end of the lap anchor 5 with respect to a tongue insertion opening 14a end by a wire clip 16, and a pulley 17 is rotably supported by a rivet 18 on this wire plate 15. The wire 11 passes over the pulley 17.

A cylindrical collar 19 is disposed within the bracket 10. The collar 19 is made up of a shaft portion 19a and a flange portion 19b. Also, an attaching hole 10a is bored through the bracket 10. The attaching hole 10a is formed to a size such that the shaft portion 19a of the collar 19 can pass through, but the flange portion 19b cannot pass through. Inserting the shaft portion 19a of the collar 19 into the attaching hole 10a and then rotating the shaft portion 19a fixes the collar 19 to the bracket 10. The fixing mechanism of the collar 19 to the bracket 10 may be any known fixing mechanism, as long as fixing can be effected by inserting a shaft into a hole and rotating.

Further, a cylinder 21 formed of a cylindrical pipe 20 made of iron or aluminum, for example, is attached to the bracket 10 with a pair of screws 22 and 23. In this case, the side of the pipe 20 to be attached to the bracket 10 has a curved portion 20a curved at a certain angle, and the curved portion 20a of the pipe 20 is attached to the bracket 10 with the pair of screws 22 and 23. One straight portion 20b of the pipe 20 on the one side of the curved portion 20a serves as a piston sliding portion 20b where a piston 24 slides, and the other straight portion 20c of the pipe 20 on the other side of the curved portion 20a serves as a gas generator storage unit 20c for storing a gas generator 25 described in more detail below.

Also, though not shown in the drawings, a wire through hole is provided in the curved portion 20a of the pipe 20 coaxially with the center axis of the piston sliding portion 20b of the cylinder 21 (i.e., the center axis of the piston 24), by punching or the like, for example, and the wire 12 slidably passes through this wire through hole in an airtight manner.

The piston 24 is provided within the piston sliding portion 20b of the cylinder 21 in a slidable and airtight manner. The piston 24 is formed of a piston portion 24a and a rod 24b extending from the piston portion 24a. An o-ring or gasket 26 is provided for keeping airtight with the inner circumference of the piston sliding portion 20b on the piston portion 24a. Also, a ball ring 27 is fit to the rod 24b, and a predetermined number of balls 28 are supported by the ball ring 27. In this case, the ball ring 27 and the predetermined number of balls 28 are positioned at a portion of the rod 24b adjacent to the piston portion 24a.

The predetermined number of balls 28 are in contact with the outer circumferential face 24b1 of the rod 24b. The outer circumferential face 24b1 is formed as a curved face or an inclined face wherein the diameter increases in the lower right diagonal axial direction in FIG. 2. The predetermined number of balls 28 are positioned closest to the piston portion 24a on the outer circumferential face 24b1 of the rod 24b under normal conditions, and in this situation the balls 28 are hardly pressed at all against the inner circumferential face of the piston sliding portion 20b, and the piston 24 can readily slide on the lower right diagonal direction. Also, in the event that the piston 24 moves somewhat in the upper left diagonal direction following the axial direction of the piston sliding portion 20b, the balls 28 move in the lower right diagonal direction, so the balls 28 are strongly pressed against the inner circumferential face of the piston sliding portion 20b by the curved or inclined outer circumferential face 24b1. Pressing the balls 28 against the inner circumferential face of the cylinder 21 causes the piston 24 to be engaged with the inner circumferential face of the piston sliding portion 20b, and prevent further movement of the piston 24 in the upper left diagonal direction.

Due to the arrangement described above, a one-direction clutch is formed of the predetermined number of balls 28, the outer circumferential face 24b 1 of the rod 24b, and the inner circumferential face of the piston sliding portion 20b, wherein, in the event of movement of the piston 24 in the lower right diagonal direction as to the piston sliding portion 20b, the piston sliding portion 20b and the piston 24 are not engaged, so movement of the piston 24 in the lower right direction is permitted, while in the event of movement of the piston 24 in the upper left diagonal direction as to the piston sliding portion 20b, the piston sliding portion 20b and the piston 24 are engaged, so movement of the piston 24 in the lower right direction is prevented.

One end of the wire 12 passes through the piston portion 24a and the rod 24b and is connected to the side of the rod 24b opposite the piston portion 24a. The wire 12 passes from the piston 24 through the aforementioned wire through hole formed on the curved portion 20a of the pipe 20 in an airtight and slidable manner and extends externally from the cylinder 21 in the upper left diagonal direction, and further is bent by the collar 19 attached to the bracket 10 so that the direction thereof is changed in that of the connector assembly 14.

The wire 12 extends in the direction of the connector assembly 14 passing through the inner cover 13 while being carried and guided by the wire holder 11. The wire 12 hangs on the pulley 17 rotably supported within the connector assembly 14 as described above, and then passes through the inner cover 13 again and is held and guided by the wire holder 11 and extends so as to return in the direction of the bracket 10.

The end of the wire 12 which has returned toward the bracket 10 is positioned by a wire end 29 retained and fixed to the bracket 10. The wire end 29 is retained and fixed to a sub-bracket 32 fixed to the bracket 10 with a pair of screws 30 and 31.

A gas generator 25 is stored and fixed within a gas generator storage portion 20c. Preferably, the gas generator 25 is off-center from the center axis of the piston 24, so as to not interfere with the wire 12.

As shown in FIG. 2, reference numeral 45 denotes a bolt which passes through an attaching hole 10a of the bracket 10 and the inner hole of the collar 19, so as to attach the pretensioner 9 to the vehicle body.

The inner cover 13 of the pretensioner 9 is kept at the most extended state as shown in FIG. 2 (in the activated condition), and the connector assembly 14 is set at a position farthest from the bracket 10.

When the lap anchor 5 is inserted from the insertion opening 14a as described below and is engaged with the connector assembly 14 the seatbelt is worn so that in the event that the vehicle is subjected to a great deceleration force such as collision of the vehicle or the like, the gas generator 25 operates to generate high-pressure reaction gas. The generated gas passes through the curved portion 20a of the pipe 20 and intrudes into the piston sliding portion 20b, so that the gas pressure acts upon the piston 24. Thus, the piston 24 moves in the lower right diagonal direction in FIG. 2, thereby pulling the wire 12 and subjecting the connector assembly 14 and the lap anchor 5 to a pulling force in the direction of the bracket 10.

This causes the connector assembly 14 and the lap anchor 5 to be pulled toward the bracket 10 while collapsing the inner cover 13. In this case, the inner cover 13 is collapsed such that the cover portion on the connector assembly 14 side is positioned on the outer side of the cover portion on the bracket 10 side with which it is continuously disposed. Accordingly, the seatbelt 3 is pulled via the connector assembly 14 and the lap anchor 5, so that the passenger is rapidly restrained by an increased restraining force.

The scope of the present invention includes other known pretensioners instead the gas generator and piston type pretensioner shown in FIG. 2.

Figure 3:
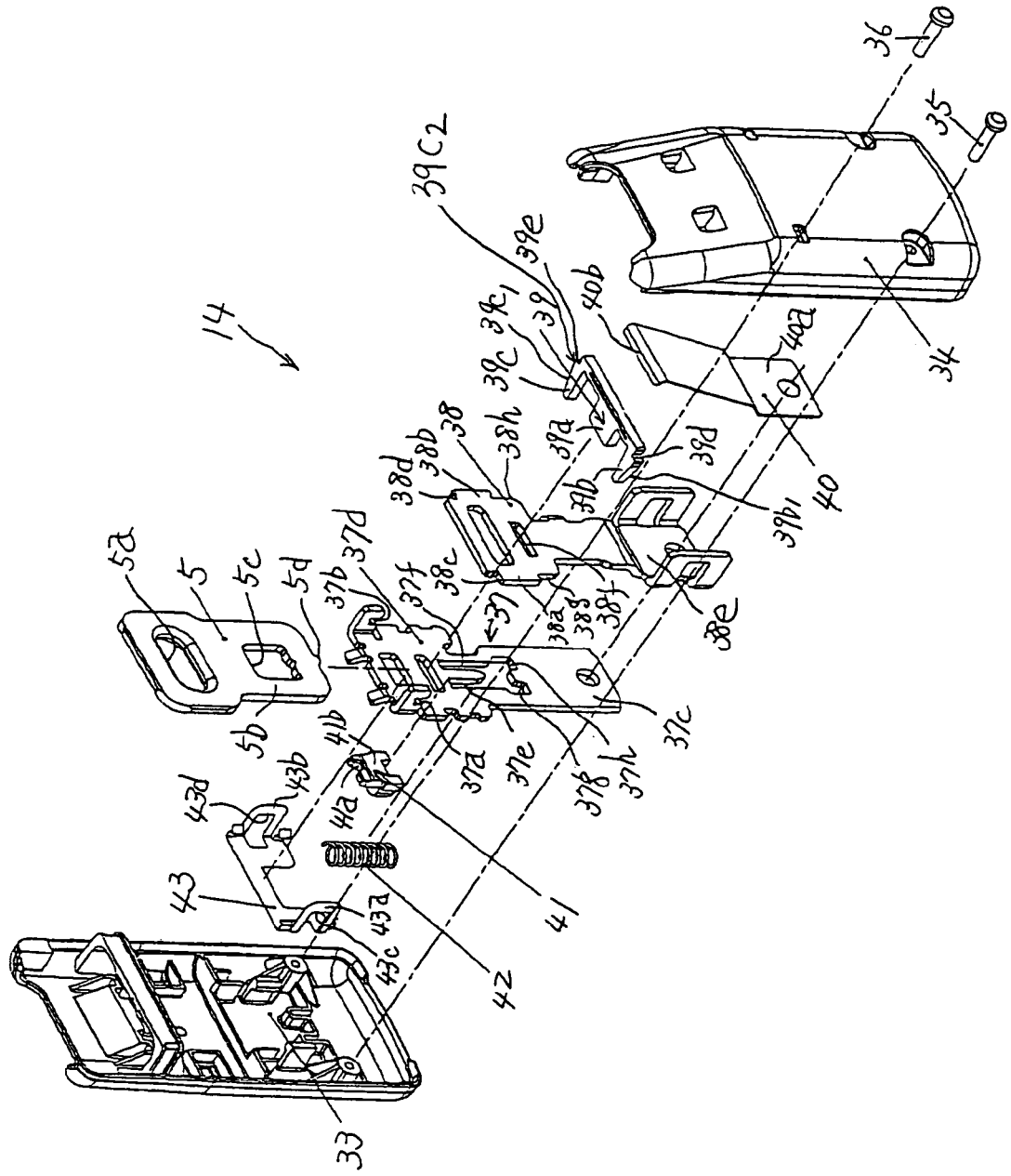
FIG. 3 is a disassembled perspective view of the connector assembly of the pretensioner used in the example of the seatbelt device shown in FIG. 1.
Figure 4B:
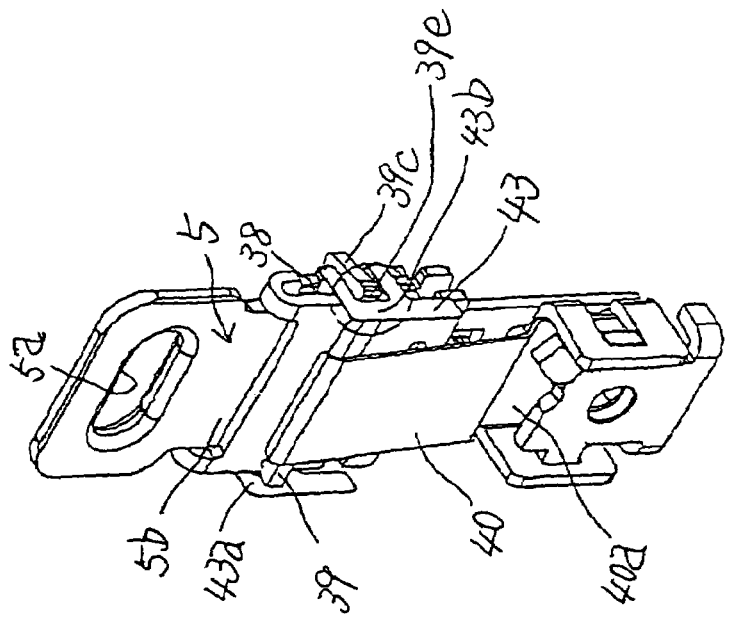
FIG. 4(b) is a cross-sectional diagram illustrating a latched state with the lap anchor inserted.
Figure 4A:
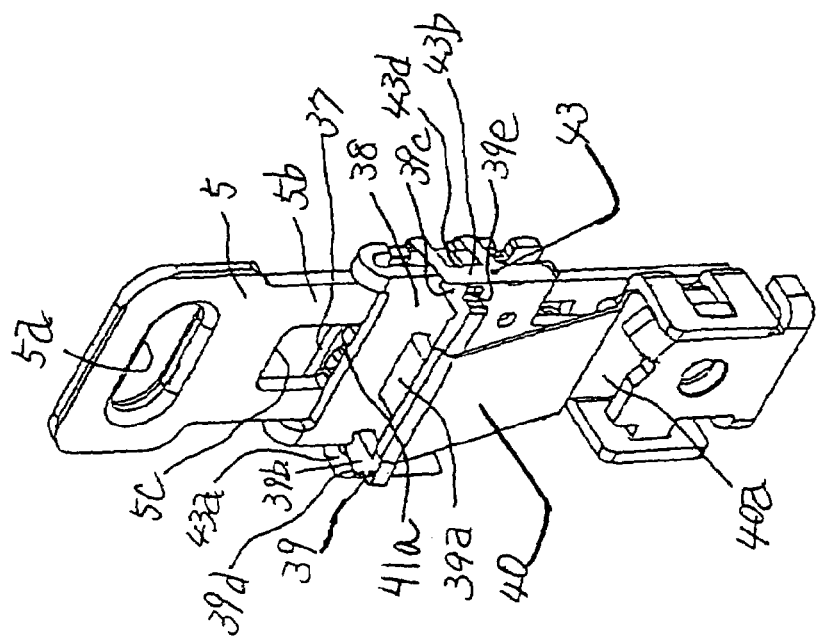
FIG. 4(a) is a cross-sectional diagram illustrating an unlatched state with the lap anchor not inserted.

As shown in FIG. 3 and FIGS. 4(a) and (b), the connector assembly 14 includes an upper cover 33, a lower cover 34, a pair of screws 35 and 36 for detachably connecting the upper cover 33 and lower cover 34, a first connector base 37 detachably fixed to the upper cover 33, a second connector base 38 detachably fixed to the a first connector base 37, a latch 39 engageable with the lap anchor 5, a first latch spring 40 (equivalent to the elastic pressing member of the present invention) which is formed of a leaf spring and elastically presses the latch 39 at all times in the direction of engaging with the lap anchor 5, an ejector 41 for pressing the lap anchor 5 upwards, i.e., in the direction for releasing from the connector assembly 14, an ejector spring 42 for pressing this ejector 41 upwards at all times, and a second latch spring 43 (i.e., the elastic prevention member) which is formed of a leaf spring and elastically prevents the latch 39, which is in an engaged state with the lap anchor 5, from moving in a direction that would lead to disengagement from the lap anchor 5.

The latch mechanism includes the latch 39 and the first latch spring 40, and the disengagement prevention mechanism includes the second latch spring 43.

The second connector base 38 is detachably fixed to the first connector base 37 by shoulder portions 38c and 38d on protrusions 38a and 38b on the left and right portions of the second connector base 38 each being fit into grooves 37a and 37b on the left and right of the first connector base 37, and a lower end portion 38e thereof being abutted against a lower end portion 37c of the first connector base 37, and connected with a screw (not shown). Note that the lower end portion 40a of the first latch spring 40 is also fastened together and fixed with the same screw as with the lower end portion 37c of the first connector base 37 and the lower end portion 38e of the second connector base 38.

The grooves 37a and 37b of the first connector base 37 are provided a predetermined distance away from the surface of the main unit 37d, and the lower end portion 38e of the second connector base 38 is formed protruding in the direction of the first connector base 37 by a predetermined amount. As a result, when the first and second connector bases 37 and 38 are connected, a gap α of a predetermined width is formed between the connector bases 37 and 38 from the middle portion toward the upper end of the first and second connector bases 37 and 38, as shown in FIGS. 5(e)

and (f). The gap a is formed so as to open upwards in FIG. 3. Also, as shown in FIGS. 5(a)–5(d), the retaining portion 5b of the lap anchor 5 can be detachably inserted into the gap a with very little movement or play.

The latch 39 is formed in an E-shape including a centrally provided latch portion 39a and left and right guide portions 39b and 39c. The left and right guides 39b and 39c have inclined faces 39b1 and 39c1 on the outer faces thereof inclining so that the width between the outer faces gradually becomes smaller toward the direction of engagement between the latch 39 and the lap anchor 5. The retaining shoulder portions 39d, 39e are formed by notching the base portion of the left and right guide portions 39b, 39c, respectively.

The latch 39 includes the latch portion 39a slidably inserted through a through hole 38f extending in the left and right directions of the second connector base 38. The latch 39 also includes the left and right guide portions 39b and 39c each slidably guided by the guide faces 38g and 38h of the second connector base 38, so as to be slidably disposed on the second connector base 38 in a direction orthogonal thereto. The latch 39 is engaged with the lap anchor 5 by inserting the latch portion 39a which has passed through the through hole 38f into the retaining hole 5c of the retaining portion 5b of the lap anchor 5 which has been inserted into the gap between the first and second connector bases 37, 38.

The upper end portion of the first latch spring 40 is bent to form a bent portion 40b, and as shown in FIGS. 5(b) and (d). The first latch spring 40 is in contact with the latch 39 such that the bent portion 40b is positioned on the upper face of the latch 39. The spring force of the first latch spring 40 constantly presses the latch 39 in the direction of engaging with the lap anchor 5 (toward the left in FIGS. 5(a) through (d)).

The ejector 41 slides in a vertical direction guided by the vertical guide grooves 37e, 37f formed on the first connector base 37, as shown in FIG. 3. The ejector 41 is disposed on the path where the lap anchor 5 moves, and is arranged so that the lower end of the lap anchor 5 comes into contact with the ejector 41 when the lap anchor 5 is inserted into the aforementioned gap a as shown in FIGS. 5(b) and (d). The center of the lap anchor 5 and the center of the ejector 41 are formed to match by a triangular protrusion 5d formed on the bottom center of the lap anchor 5 fitting to a V-shaped recess 41a formed on the top center of the ejector 41.

An ejector spring 42 is disposed in a compressed manner between spring supporting portions 37g and 37h of the first connector base 37 and the ejector 41, so that the ejector 41 is pressed upwards by the spring force of the ejector spring 42. As a result, when the lower end of the lap anchor 5 comes into contact with the ejector 41 and moves the ejector 41 downwards, the ejector 41 presses the lap anchor 5 in the direction of being discharged from the connector assembly 14, by the spring force of the ejector spring 42. When the lap anchor 5 is not inserted into the connector assembly 14, the ejector 41 is held at the highest position, abutted against the guide grooves 37e and 37f.

The second latch spring 43 is formed in the shape of a square with one end open, having latch holding portions 43a, 43b on the left and right ends, and is detachably fixed to the first connector base 37. Through holes 43c, 43d through which a part of the left and right guide portions 39b, 39c of the latch 39 are respectively opened in the left and right latch holding portions 43a, 43b. The left and right latch holding portions 43a and 43b have spring elasticity and are arranged to open in the left and right directions upon external force being applied in the direction of being mutually distanced, and so as to return to the state shown in FIG. 3 due to the spring elasticity upon the external force being removed.

When the latch 39 is set at a position to engage with the lap anchor 5, a portion of the left and right guide portions 39b, 39c pass through the through holes 43c, 43d, as shown in FIG. 4(b), 5(a) and 5(b). When the latch 39 attempts to move against the spring force of the first latch spring 40 in the direction of disengaging the engagement with the lap anchor 5 in this state, the retaining shoulder portions 39d, 39e of the guide portions 39b, 39c each engage with the latch holding portions 43a, 43b as shown in FIGS. 5(c) and (d), so that further movement of the latch 39 in the direction of disengaging is elastically prevented. Disengagement between the latch 39 and the lap anchor 5 is prevented by the second latch spring 43.

In this case, the second latch spring 43 elastically prevents disengagement between the latch 39 and the lap anchor 5, which means that the disengagement is not completely prevented. That is to say, while movement of the latch 39 in the direction of disengagement is prevented for inertia force of a level generated by an emergency or the like and applied to the latch 39, in the event that external force greater than a predetermined amount is applied to the latch 39 in the direction of disengaging, the latch holding portions 43a, 43b elastically deform, the engagements between the retaining shoulder portions 39d, 39e, and the latch holding portions 43a, 43b, are disengaged, so the latch 39 can move in the direction of being disengaged.

While not shown in the drawings, an example of a mechanism which can be used for such action is a mechanism wherein the retaining shoulder portions 39d, 39e have inclined faces or curved faces for elastically deforming the latch holding portions 43a, 43b so that the latch holding portions 43a, 43b can come loose from the retaining shoulder portions 39d, 39e in the event that external force is applied to the latch 39 in the direction of disengagement, taking the elastic force of the first latch spring 40 and the spring elastic force of the latch holding portions 43a, 43b into consideration. Of course, it is needless to say that other mechanisms may be used as the mechanism for the aforementioned action.

With the connector assembly 14 assembled, and the retaining portion 5b of the lap anchor 5 is not inserted into the connector assembly 14 as shown in FIG. 4(a), the ejector 41 is in contact with the upper end of the guide grooves 37e, 37f as described above. When the ejector 41 is in this position, the tip of the latch portion 39a abuts against the side face 41b of the ejector 41 as shown in FIGS. 5(e) and 5(f), so that the latch portion 39a is not intruding into the track of movement of the lap anchor 5, and the latch 39 is in an unengaged position.

When the retaining portion 5b of the lap anchor 5 is inserted into the connector assembly 14, the lower end of the lap anchor 5 abuts against the ejector 41 as described above in order to press the ejector 41 downwards. Accordingly, the ejector 41 moves downwards as the lap anchor 5 intrudes into the connector assembly 14, so the retaining hole 5c of the lap anchor 5 faces the tip of the latch portion 39a. Thus, the latch 39 moves in the direction of engaging and the latch portion 39a intrudes into the retaining hole 5c, so the latch 39 is at an engaging position for engaging with the lap anchor 5.

When the latch 39 moves in the direction of engagement, the latch holding portions 43a, 43b are elastically deformed and pressed open by the inclination of the inclined faces 39b1, 39c1 of the guide portions 39b, 39c of the latch 39, as indicated by the two-dot broken line in FIG. 5(a). Once the latch 39 is in the engaged position, the maximum width portions 39b2, 39c2 of the inclined faces 39b1, 39c1 face the through holes 43c, 43d, the latch holding portions 43a, 43b are restored to the original state shown in FIG. 3 by the spring elasticity thereof, and a part of the guide portions 39b, 39c passes through the through holes 43c and 43d, as shown in FIGS. 5(a) and 5(c). Thus, the retaining shoulder portions 39d, 39e, and the latch holding portions 43a, 43b, can be engaged. Accordingly, the lap anchor 5 and the connector assembly 14 are in an engaged state, as shown in FIG. 4(b). Note that only the inclined face 39b1 and latch holding portion 43a are shown in FIGS. 5(a), 5(c), and 5(e).

As shown in FIG. 1, a load limiter 44 is also provided. The buckle 7 is fixed to the vehicle floor portion of the vehicle seat toward the inward side of the vehicle, or the to the seat, by the load limiter 44. The load limiter 44 operates to restrict the load applied to the seatbelt to within a predetermined level, since a great load is applied to the seatbelt in the event of an emergency such as the vehicle colliding or the like, and the passenger is subjected to great shock from the seatbelt. The scope of the present invention includes an arrangement that does not include a load limiter 44. When a load limiter is not provided, the buckle 7 is fixed directly to the vehicle body without the load limiter 44 being introduced therebetween.

Also, the load limiter may be provided to the lap anchor 5 side or the seatbelt retractor 2, or may be provided to two or more places of the lap anchor 5 side, buckle 7 side, and seatbelt retractor 2.

With the seatbelt device 1 configured according to the exemplary embodiment shown in the drawings, the retaining portion 5b of the lap anchor 5 is inserted into the connector assembly 14 of the pretensioner 9, and the lap anchor 5 is engaged with the connector assembly 14 of the pretensioner 9, as shown in FIG. 1. Thus, the lap anchor 5 is fixed to the vehicle body through the pretensioner 9 (i.e., the tip of the seatbelt 3 is fixed to the vehicle body through the pretensioner 9).

The seatbelt 3 is the worn by the passenger across the shoulder and chest, and around the waist of the passenger, as with a conventional three-point seatbelt. To put on the seatbelt, the passenger holds the tongue 6 and the seatbelt 3 at that portion, withdraws the seatbelt 3 from the seatbelt retractor 2, and inserts and engages the tongue 6 into and with the buckle.

When the seatbelt is buckled around the passenger and a large deceleration is applied to the vehicle such as in the event of the vehicle colliding or the like, the seatbelt retractor 2 operates in the same manner as with a conventional three-point seatbelt device, in order to prevent the seatbelt 3 from being withdrawn. At the same time, the two pretensioners 8 and 9 operate, so that the lap anchor 5 is pulled while the seatbelt retractor 2 spools the seatbelt 3, the slack in the seatbelt 3 is removed, and the passenger is restrained by the seatbelt 3 in a more speedy manner. Thus, forward movement of the passenger due to the inertia thereof is prevented, and the passenger is protected.

At this time, as shown by the arrows in FIGS. 5(c) and 5(d), even in the event that the inertia force acts upon the connector assembly 14 in the direction of the latch 39 being disengaged from the lap anchor 5 even in the event of the latch 39 attempting to move in the disengaging direction, the retaining shoulder portions 39d, 39e engage the latch holding portions 43a, 43b as described above, so disengagement of the latch 39 and the lap anchor 5 is prevented. Accordingly, even in the event that such inertia force is applied to the connector assembly 14, the passenger is restrained and protected by the seatbelt 3 in an even more sure manner.

In the event that there a need to disengage the engagement between the connector assembly 14 and the lap anchor 5 for some reason, the engagement between the connector assembly 14 and the lap anchor 5 can be disengaged by removing the lower cover 34 from the upper cover 33, following which external force of a predetermined magnitude is applied to the latch 39 in the disengaging direction thereof with a suitable tool, thereby disengaging the engagement between the retaining shoulder portions 39d, 39e and the latch holding portions 43a, 43b as described above. Although not shown in the drawings, an arrangement may be made wherein a disengagement operating member such as a disengaging button or the like is provided to the connector assembly 14, so that the engagement between the retaining shoulder portions 39d, 39e and the latch holding portions 43a, 43b is disengaged by operating the disengagement operating member, thereby disengaging the engagement between the connector assembly 14 and the lap anchor 5.

Other actions of the seatbelt device 1 according to this example are essentially the same as those of conventional three-point seatbelt devices.

According to the seatbelt device 1 in this example, even in the event that inertia force acts on the connector assembly 14 in the direction of the latch 39 being disengaged from the lap anchor 5, disengagement between the latch 39 and the lap anchor 5 is prevented in a sure manner by the second latch spring 43, so the engagement between the connector assembly 14 and the lap anchor 5 can be stabilized. Accordingly, even in the event that such inertia force acts upon the connector assembly 14, the passenger can be restrained and protected in a sure manner by the seatbelt 3.

Also, the engagement of the connector assembly 14 and the lap anchor 5 is performed elastically with the first latch spring 40, and also the disengagement prevention of the connector assembly 14 and the lap anchor 5 is performed elastically with the second latch spring 43, so in the event that there is a need to disengage the connector assembly 14 and the lap anchor 5, the engagement of the connector assembly 14 and the lap anchor 5 can be readily disengaged by simply applying an external force greater than the aforementioned inertia force to the latch 39 in the direction of disengaging.

Further, the first and second latch springs 40 and 43 are both formed from leaf springs, so the structure of the connector assembly 14 of the pretensioner 9 can be simplified, and the cost of the connector assembly 14 can be reduced.

While the present invention has been described in the above example as being applied to the connector assembly 14 of the pretensioner 9 provided to the lap anchor 5 of a three-point seatbelt, the present invention is not restricted to this, and may be applied to the connector assembly of a pretensioner provided to the buckle 7 side, or may be applied to the connector assemblies of pretensioners provided to both the lap anchor 5 side and buckle 7 side. Also, the present invention is not restricted to three-point seatbelt devices, and may be applied to other seatbelt devices such as four-point seatbelt devices or two-point seatbelt devices, as long as the seatbelt device is a seatbelt device wherein the seatbelt is pulled by a pretensioner fixed to the vehicle body.

Also, the disengagement prevention mechanism according to the present invention (the second latch spring 43 in the above example) may be provided within the buckle 7 for preventing disengagement of the tongue 6 and the buckle 7. In this case, a disengaging operation member for releasing the tongue 6, which is conventionally provided to the buckle 7, is used as the mechanism for disengaging the engagement of the tongue 6 and the buckle 7.

As can be clearly understood from the foregoing description, with the seatbelt device according to the present invention, even in the event that inertia force acts on the connector portion of the pretensioner in the direction for disengaging the engagement of the connector portion and anchor by the latch mechanism, disengagement of the connector portion and the anchor is prevented in a sure manner by the disengagement prevention mechanism, so engagement of the connector portion and the anchor is stable. Accordingly, the passenger is restrained and protected by the seatbelt in an even more sure manner even in the event that such inertia force acts upon the connector portion.

According to an embodiment of the present invention, engagement and disengagement of the connector portion and the anchor are each performed elastically by the elastic pressing member and the elastic prevention member, so in the event that there is the need to disengage the connector portion and the anchor, the engagement of the connector portion and the anchor can be readily disengaged by applying an external force greater than the aforementioned inertia force in the direction of disengaging the engagement by the latch.

According to another alternative embodiment of the present invention, the elastic pressing member and the elastic prevention member are both formed of leaf springs, so the structure of the connector portion of the pretensioner is simplified, and the connector portion can be formed inexpensively.

The priority application, Japanese Patent Application No. 2002-250634, filed Aug. 29, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seatbelt device, comprising:
a pretensioner configured to cooperate with an anchor;
wherein said pretensioner includes a connector portion, and
wherein the anchor is configured to be inserted into and engaged with said connector portion; and
wherein said connector portion includes a latch mechanism for engaging said anchor with the connector portion, and a disengagement prevention mechanism for preventing disengagement between said connector portion and said anchor in the event that a force acts upon said connector portion in a direction that urges disengagement of the connector portion and the anchor, wherein the disengagement prevention mechanism comprises an elastic prevention member configured to be attached to and fixed into position by the latch mechanism when the anchor is engaged with the connector portion.

2. The device of claim 1, wherein said latch mechanism comprises a latch for engaging said anchor with said connector portion and an elastic pressing member for pressing said latch in the direction of engagement between said anchor and said connector portion.

3. The device of claim 2, wherein said elastic pressing member and said elastic prevention member are both formed of leaf springs.

4. The device of claim 1, wherein the disengagement prevention member comprises two apertures that mate with the latch mechanism to prevent disengagement between said latch mechanism and said anchor.

5. The device of claim 4, wherein the latch mechanism comprises two protrusions with notches that mate with the two apertures of the disengagement prevention member.

6. The device of claim 1, wherein the disengagement prevention member is fixed to left and right sides of the latch mechanism.

7. A device for protecting an occupant of a vehicle comprising:
a seatbelt;
an anchor connected to a lap belt portion of the seat belt for securing the lap belt portion of the seat belt to the vehicle;
a pretensioner configured to be engaged with the anchor;
a first elastic member positioned and configured to urge the anchor and the pretensioner to remain engaged when the anchor is engaged with the pretensioner; and
a second elastic member positioned to prevent the pretensioner and the anchor from being disengaged when a force is applied to the seatbelt in the event that the vehicle is involved in a collision, wherein the second elastic member is configured to be attached to and fixed into position by a latching mechanism when the anchor is engaged with the pretensioner.

8. The device of claim 7, wherein the elastic members are leaf springs.

9. The device of claim 7, further comprising a tongue connected to the seat belt.

10. The device of claim 9, further comprising a buckle for receiving the tongue when the seat belt is worn by the occupant.

11. The device of claim 7, further comprising a retractor for winding the seatbelt around a spool when the seatbelt is not being worn by the occupant.

12. The device of claim 7, wherein the second elastic member comprises two apertures that mate with the latch mechanism to prevent disengagement between said pretensioner and said anchor.

13. The device of claim 12, wherein the latch mechanism comprises two protrusions with notches that mate with the two apertures of the second elastic member.

14. The device of claim 7, wherein the second elastic member is fixed to left and right sides of the latch mechanism.

15. A seatbelt device, comprising:
a pretensioner configured to cooperate with an anchor, wherein said pretensioner includes a connector portion; and
an inner cover with one end attached to the connector portion and an opposite end attached to a wire holder,
wherein the anchor is configured to be inserted into and engaged with said connector portion; and
wherein said connector portion includes a latch mechanism for engaging said anchor with the connector portion, and a disengagement prevention mechanism for preventing disengagement between said connector portion and said anchor in the event that a force acts upon said connector portion in a direction that urges disengagement of the connector portion and the anchor, wherein the disengagement prevention mechanism comprises an elastic prevention member configured to be attached to and fixed into position by the latch mechanism when the anchor is engaged with the connector portion.

* * * * *